(12) United States Patent
Dangat et al.

(10) Patent No.: US 9,058,459 B1
(45) Date of Patent: Jun. 16, 2015

(54) INTEGRATED CIRCUIT LAYOUTS AND METHODS TO REDUCE LEAKAGE

(71) Applicant: Samsung Electronics Co., Ltd., Suwon-si, Gyeonggi-do (KR)

(72) Inventors: Harish Dangat, San Jose, CA (US); Young Koog, Saratoga, CA (US); Sarita Baswant, Cupertino, CA (US); Prasanth Koduri, Fremont, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/228,232

(22) Filed: Mar. 27, 2014

Related U.S. Application Data

(60) Provisional application No. 61/922,087, filed on Dec. 30, 2013.

(51) Int. Cl.
*G06F 17/50* (2006.01)

(52) U.S. Cl.
CPC ........ *G06F 17/5072* (2013.01); *G06F 2217/78* (2013.01)

(58) Field of Classification Search
CPC .................... G06F 17/5072; G06F 2217/78
See application file for complete search history.

(56) References Cited

U.S. PATENT DOCUMENTS

| | | | |
|---|---|---|---|
| 6,400,182 B2 * | 6/2002 | Ikeda | 326/101 |
| 6,536,024 B1 * | 3/2003 | Hathaway | 327/295 |
| 6,820,240 B2 * | 11/2004 | Bednar et al. | 716/113 |
| 6,873,185 B2 * | 3/2005 | Cox | 326/47 |
| 6,924,661 B2 * | 8/2005 | Buffet et al. | 326/38 |
| 7,051,306 B2 * | 5/2006 | Hoberman et al. | 716/127 |
| 7,065,690 B1 * | 6/2006 | Yoshida et al. | 714/724 |
| 7,127,695 B2 * | 10/2006 | Huang et al. | 716/103 |
| 7,266,797 B2 * | 9/2007 | Bakir et al. | 716/120 |
| 7,278,120 B2 * | 10/2007 | Rahmat et al. | 716/111 |
| 7,279,926 B2 * | 10/2007 | Severson et al. | 326/33 |
| 7,533,357 B2 * | 5/2009 | Carlsen et al. | 716/136 |
| 7,659,746 B2 * | 2/2010 | Chua-Eoan et al. | 326/83 |
| 7,696,788 B2 * | 4/2010 | Ogata | 326/101 |
| 7,755,148 B2 * | 7/2010 | Kanno et al. | 257/393 |
| 7,760,011 B2 * | 7/2010 | Wang et al. | 327/544 |
| 7,810,053 B2 * | 10/2010 | Bushnell et al. | 716/108 |
| 7,844,935 B2 * | 11/2010 | Nakamura | 716/100 |
| 7,996,796 B2 * | 8/2011 | Nonaka et al. | 716/100 |
| 8,042,087 B2 * | 10/2011 | Murali et al. | 716/138 |
| 8,191,026 B2 | 5/2012 | Motomura | |
| 8,392,862 B1 | 3/2013 | Siguenza et al. | |
| 8,434,048 B2 * | 4/2013 | Marrou | 716/133 |
| 8,504,967 B2 * | 8/2013 | Suzuki et al. | 716/120 |
| 8,736,342 B1 * | 5/2014 | Bucelot et al. | 327/304 |
| 2006/0225020 A1 * | 10/2006 | Chandrakasan et al. | 716/17 |
| 2008/0098340 A1 * | 4/2008 | Oh | 716/8 |
| 2010/0161303 A1 * | 6/2010 | McGowan et al. | 703/13 |
| 2012/0066530 A1 * | 3/2012 | Suzuki et al. | 713/322 |

* cited by examiner

*Primary Examiner* — Naum B Levin

(74) *Attorney, Agent, or Firm* — Renaissance IP Law Group LLP

(57) ABSTRACT

An embodiment includes a method, comprising: receiving a layout of an integrated circuit having a plurality of regions; determining a utilization for each of the regions; for each region, selecting from among a plurality of switch cell organizations for the region in response to the corresponding utilization; and for each region, modifying the layout to include switch cells for the region according to the selected switch cell organization.

20 Claims, 5 Drawing Sheets

US 9,058,459 B1

INTEGRATED CIRCUIT LAYOUTS AND METHODS TO REDUCE LEAKAGE

BACKGROUND

This disclosure relates to integrated circuit layouts and methods, and, in particular, integrated circuit layouts and methods to reduce power leakage.

Integrated circuits and, in particular, low-power integrated circuits, may include circuitry to switch power to portions of the circuits. Although such circuitry may disable portions of the integrated circuit and consequently, reduce power usage, a battery life may also depend on the standby current of such a device. The switching circuitry itself may have leakage current that contributes to the standby current and hence, reduces battery life.

SUMMARY

An embodiment includes a method, comprising: receiving a layout of an integrated circuit having a plurality of regions; determining a utilization for each of the regions; for each region, selecting from among a plurality of switch cell organizations for the region in response to the corresponding utilization; and for each region, modifying the layout to include switch cells for the region according to the selected switch cell organization.

Another embodiment includes a system, comprising: a memory configured to store a layout of an integrated circuit having a plurality of regions; a processor coupled to the memory and configured to, for each of the regions: determine a utilization; select from among a plurality of switch cell organizations for the region in response to the corresponding utilization; and modifying the layout to include switch cells for the region according to the selected switch cell organization.

Another embodiment includes a computer readable medium storing instructions, comprising: instructions for receiving a layout of an integrated circuit having a plurality of regions; instructions for determining a utilization for each of the regions; instructions for, for each region, selecting from among a plurality of switch cell organizations for the region in response to the corresponding utilization; and instructions for, for each region, modifying the layout to include switch cells for the region according to the selected switch cell organization.

DETAILED DESCRIPTION

Figure 1A:
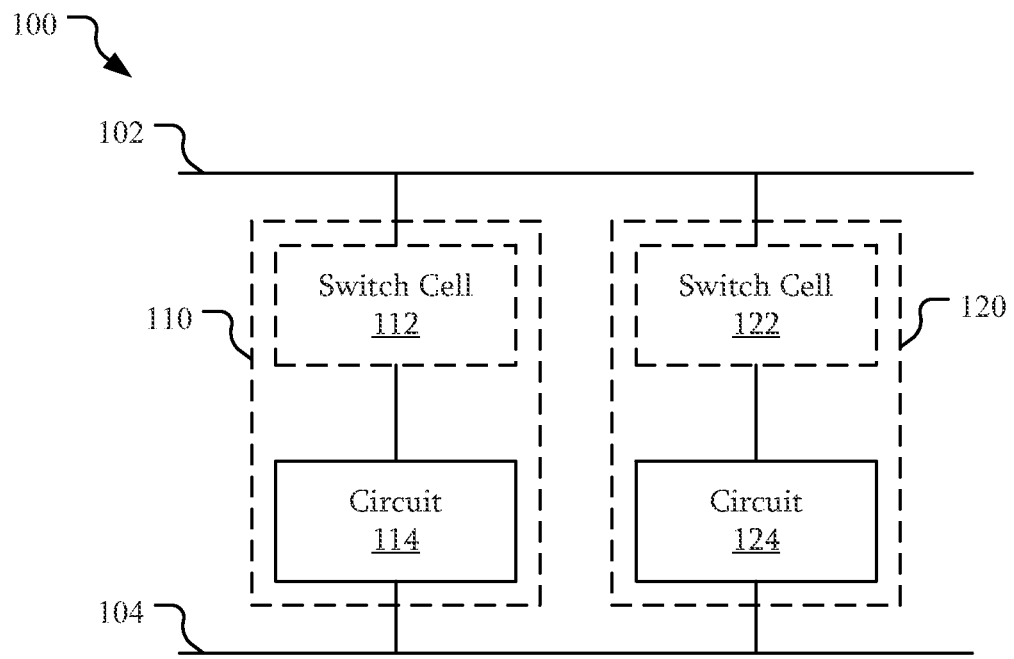
FIG. 1A is a schematic view of a layout of an integrated circuit.

The embodiments relate to integrated circuits with reduced leakage. The following description is presented to enable one of ordinary skill in the art to make and use the embodiments and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of this disclosure. The exemplary embodiments will also be described in the context of particular methods having certain steps. However, the method and system operate effectively for other methods having different and/or additional steps and steps in different orders that are not inconsistent with the exemplary embodiments. Thus, embodiments are not intended to be limited to the particular embodiments shown, but are to be accorded the widest scope consistent with the principles and features described herein.

The exemplary embodiments are described in the context of particular systems having certain components. One of ordinary skill in the art will readily recognize that embodiments are consistent with the use of systems having other and/or additional components and/or other features. The method and system are also described in the context of single elements. However, one of ordinary skill in the art will readily recognize that the method and system are consistent with the use of systems having multiple elements.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

FIG. 1A is a schematic view of a layout of an integrated circuit. In this embodiment, the layout 100 includes switch cells 112 and 122. The switch cells 112 and 122 are configured to switch power to regions 110 and 120 of the layout 100. The switch cell 112 is configured to switch power to circuits in region 110, such as circuit 114. Similarly, the switch cell 122 is configured to switch power to circuits in region 120, such a circuit 124. Accordingly, the circuits 114 and 124 are configured to receive power from power rails 102 and 104 through the corresponding switch cells 112 and 122, respectively. For example, power rails 102 and 104 may be configured to provide Vdd and Vss, respectively. The switch cells 112 and 122 are configured to switch Vdd to the circuits 114 and 124.

In this embodiment, the switch cells 112 and 122 are illustrated with dashed lines to reflect that the switch cells 112 and 122 may not yet be placed. For example, the switch cells 112 and 122 may represent the intended region for switch cells in the layout 100, but switch cells have not been selected for the switch cells 112 and 122, the switch cells have not been placed, or the like. However, in other embodiments, the switch cells 112 and 122 may be already placed in the layout 100. In particular, the switch cells 112 and 122 may be substantially similar in this layout 100.

Figure 1B:
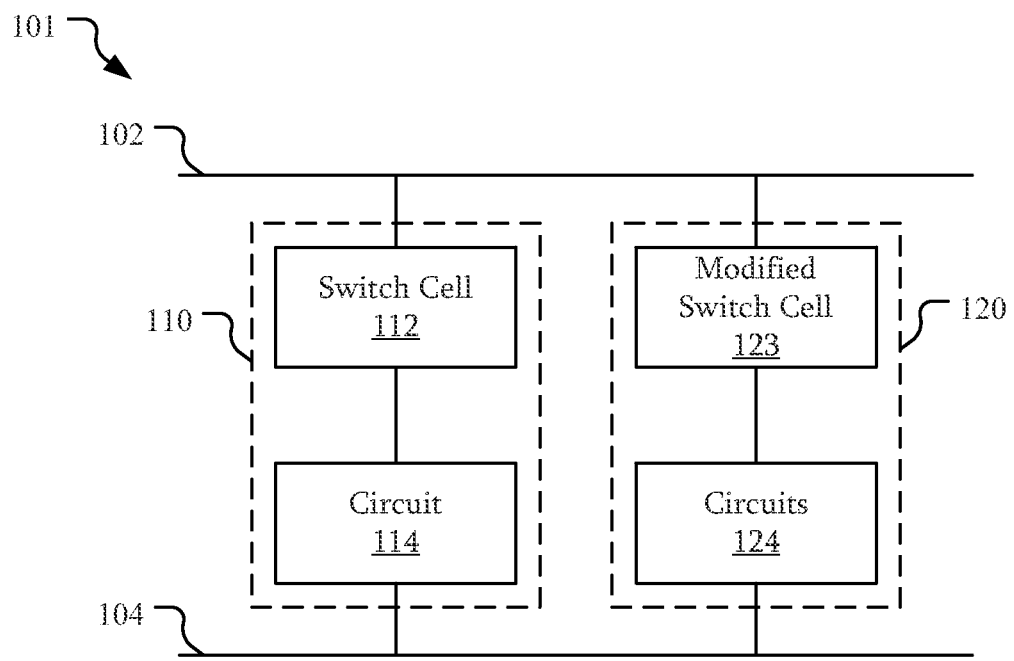
FIG. 1B is a schematic view of the layout of the integrated circuit of FIG. 1A modified to include a modified switch cell according to an embodiment.

FIG. 1B is a schematic view of the layout of the integrated circuit of FIG. 1A modified to include a modified switch cell according to an embodiment. In this embodiment, layout 101 has been modified to that switch cell 112 was placed and modified switch cell 123 was placed. Although the term modified has been used to describe switch cell 123, as will be described in further detail below, the switch cell 123 may be merely different from the switch cell 122.

As will be described in further detail, the modified switch cell 123 may be selected based on the circuits in the region 120, such as the circuit 124. In particular, the modified switch cell 123 may be selected based on the density, the clock speed, the type of circuit, the power usage, or the like of the circuit 124. A modified switch cell 123 may have a lower leakage than the switch cell 112. As a result a standby current of a device using an integrated circuit fabricated using the layout 101 may be reduced. Accordingly, a battery life, power consumption, or the like may be improved.

Figure 2:
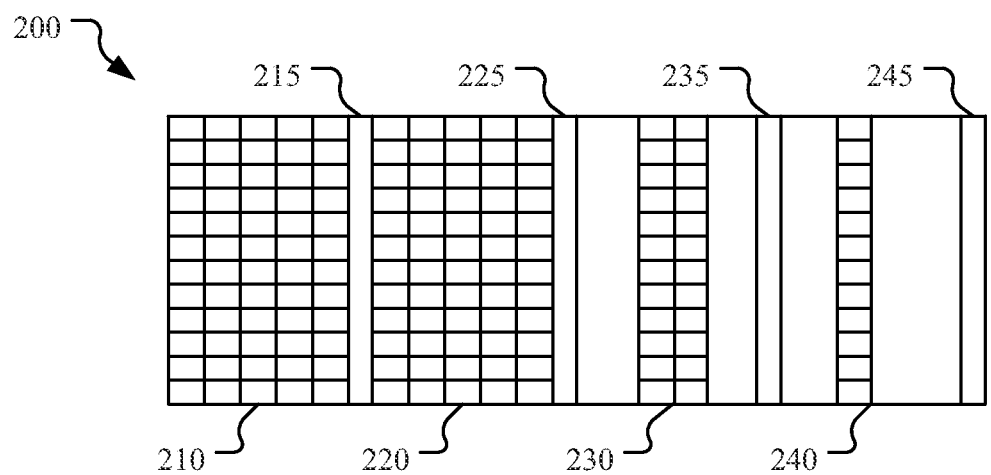
FIG. 2 is a schematic view of an integrated circuit with regions with different circuit densities according to an embodiment.

FIG. 2 is a schematic view of an integrated circuit with regions with different circuit densities according to an embodiment. In this embodiment, the layout 200 includes multiple logic cells in regions 210, 220, 230, and 240. Here, logic cells will be used as an example of circuits within the regions 210, 220, 230, and 240; however, in other embodiments, other types of circuits may be present in the regions 210, 220, 230, and 240. Each of regions 210, 220, 230, and 240 is associated with one of the switch cell regions 215, 225, 235, and 245 that include or are intended to include switch cells configured to switch power to the corresponding region. For clarity, power rails and other portions of the layout are omitted.

Here, regions 210, 220, 230, and 240 may have different logic cell densities. For example, regions 210 and 220 include higher densities of logic cells than regions 230 and 240. Region 230 also has a higher density than region 240. Although four regions 210, 220, 230, and 240 with three different densities have been used as an example, other regions may have different densities. Moreover, the logic cell density may be different within a given region, offset to one side of a region, or the like.

Figure 3:
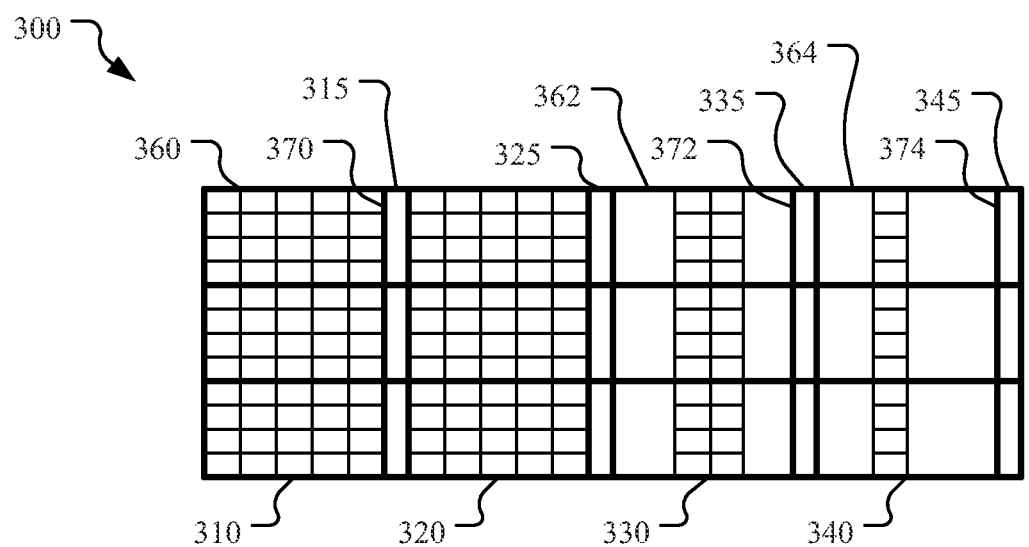
FIG. 3 is a schematic view of an integrated circuit with regions with different circuit densities according to another embodiment.

FIG. 3 is a schematic view of an integrated circuit with regions with different circuit densities according to another embodiment. In this embodiment, the layout 300 includes logic cells in regions 310, 320, 330, and 340 similar to logic cells in regions 210, 220, 230, and 240, and switch cell regions 315, 325, 335, and 345 similar to switch cell regions 215, 225, 235, and 245. However, in this embodiment, the logic cells in regions 310, 320, 330, and 340 are each divided into multiple sub-regions. The switch cell regions 315, 325, 335, and 345 are similarly each divided into corresponding multiple sub-regions. For clarity, only logic cell regions 360, 362, and 364 and switch cell regions 370, 372, and 374 are identified.

Although logic cells in regions 310, 320, 330, and 340 and switch cell regions 315, 325, 335, and 345 have each been illustrated as being divided into three equal-size sub-regions, the logic cells and corresponding switch cells may be divided in different ways. For example, any grouping of logic cells with switch cells in common may be grouped together. Moreover, although regions 310, 320, 330, and 340 have been described as being divided into multiple sub-regions, in other embodiments, the sub-regions such as sub-regions 360, 362, and 364 may be the primary regions. Accordingly, the following description will refer to sub-regions 360, 362, and 364 as regions.

In this embodiment, logic cell region 360 is associated with switch cell region 370. That is, the switch cells in switch cell region 370 are configured to switch power to the logic cells in logic cell region 360. Logic cell regions 362 and 364 are similarly associated with switch cell regions 372 and 374, respectively. Here, logic cell regions 360, 362, and 364 include different densities of logic cells. In particular, logic cell region 360 has a higher density, logic cell region 364 has a lower density, and logic cell region 362 has a density between the densities of regions 360 and 364.

Using the density, a switch cell organization for the corresponding logic cell region may be selected. For example, a switch cell organization having more switch cells can be used for switch cells in region 370. However, since logic cell regions 362 and 364 have lower densities, a different switch cell organization may be used, such as one having less switch cells, may be used for switch cell regions 372 and 374. In another example, switch cell regions 370 and 372 may have the same switch cell organization while switch cell region 374 has a different switch cell organization.

In an embodiment, the decision to select a particular switch cell organization can be made using a factor calculated for a given region. For example, a utilization U may be determined. The utilization may be equal to or based on the density of cells in the region. Although density has been used as an example, other factors may be used in the utilization. For example, a number of cells in the region may be used to calculate the utilization, particularly if the regions 360, 362, and 364 are substantially similarly sized.

In another example, the utilization may be based on a type of cells. For example, a density or other utilization of one type of cells may be scaled by a first factor while a density of a second type of cells may be scaled by a second, different factor. In a particular example, a contribution of clock cells to the density may be scaled by a factor of two relative to other logic cells. Although two has been used as an example, the value used to scale clock cells or any other types of cells may be different. Furthermore, although two different types of cells have been used as an example, different number of types of cells may be used. For example, three or more different types of cells, each with different scaling factors. Furthermore, although scaling the density of the cells has been used as an example, other attributes of the cells, such as the number of the cells, may be scaled by the different factors in calculating a utilization.

In an embodiment, the scaling factor may be determined by an expected operation of the type of cells. For example, clock cells may be expected to continuously switch when operating, increasing the power usage. However, other types of cells may be expected to have a different number of transitions, resulting in a lower power usage. The corresponding scale factors may be selected according to such differences.

Once the utilization has been calculated, the utilization may be multiplied by the clock speed of the cells in the region. For example, a final utilization U may be calculated using equation 1.

$$U = \text{Density} \cdot \text{ScaleFactor} \cdot \text{ClockSpeed} \quad (1)$$

Although equation 1 uses a particular combination of factors in calculating the utilization, the utilization may be calculated using other combinations. For example, equations 2-4 give various other examples of different techniques to calculate the utilization.

$$U = \text{NumberOfCells} \cdot \text{ScaleFactor} \cdot \text{ClockSpeed} \quad (2)$$

$$U = \text{Area} \cdot \text{ClockSpeed} \quad (3)$$

$$U = \text{Density} \cdot \text{ScaleFactor} \quad (4)$$

Figure 4:
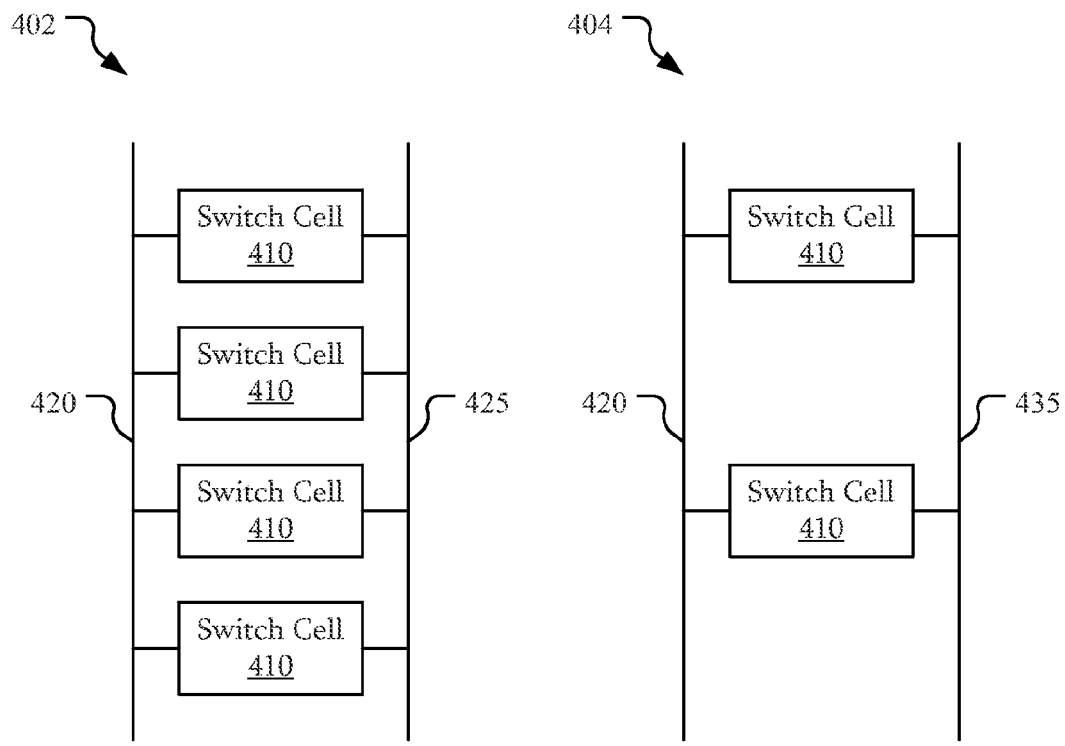
FIGS. 4-6 are schematic views of switch cell organizations according to various embodiments.
Figure 5:
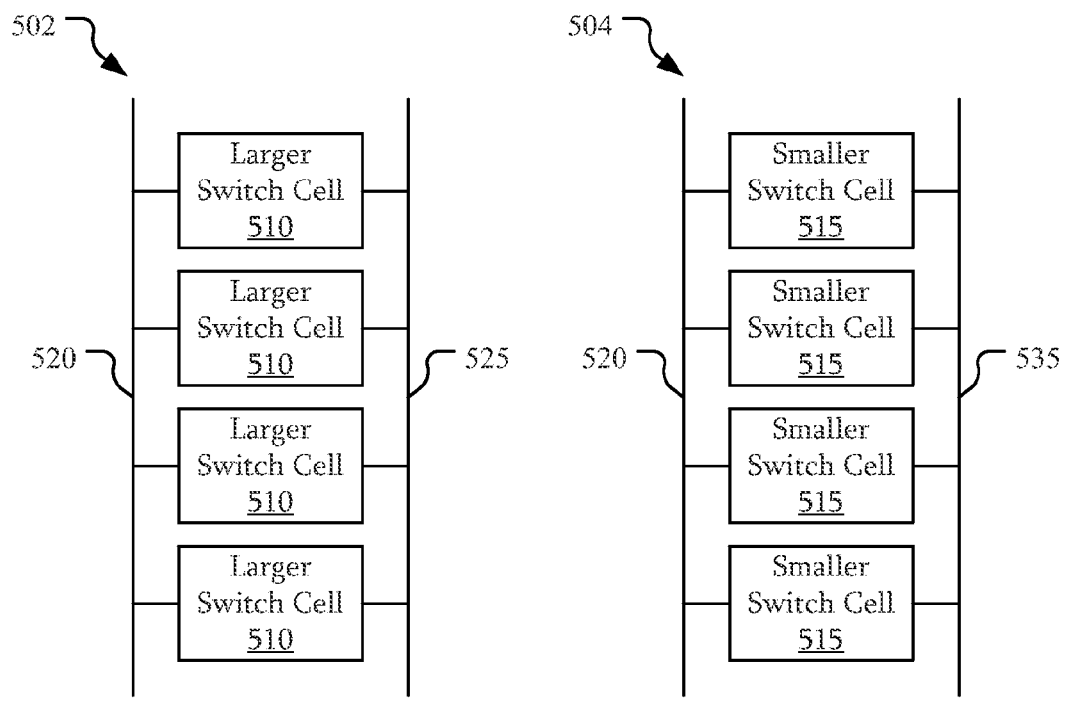
Figure 6:
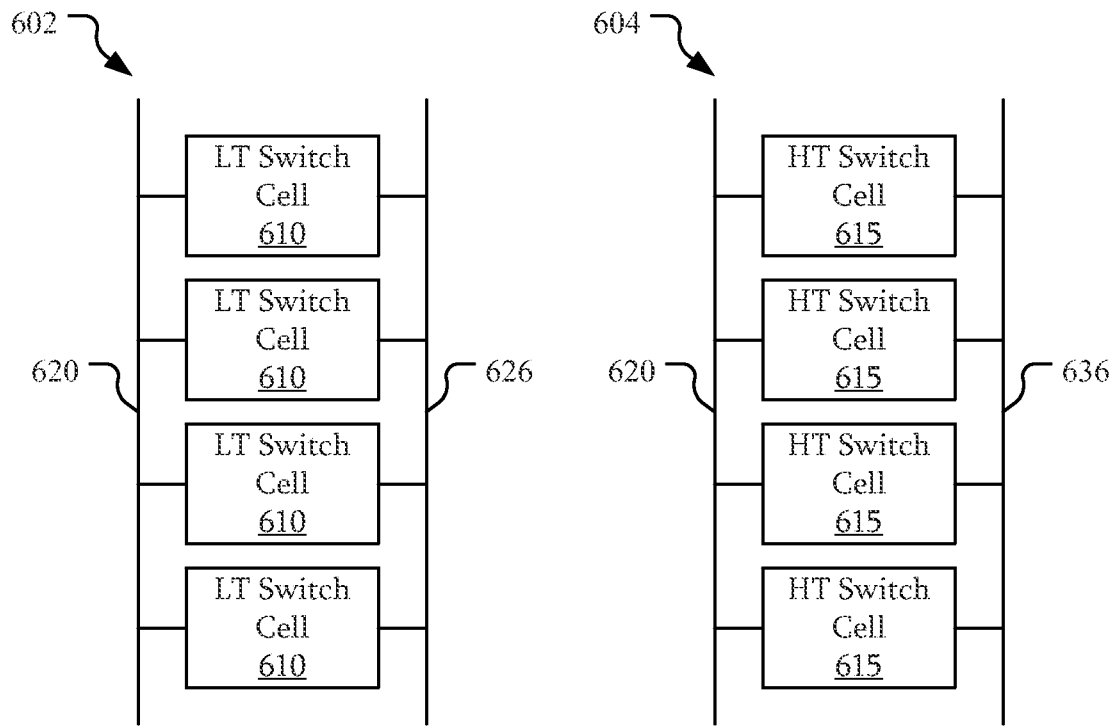

FIGS. 4-6 are schematic views of switch cell organizations according to various embodiments. Referring to FIG. 4, in this embodiment, a first switch cell organization 402 includes multiple switch cells 410 configured to switch power from a power rail 420 to a local power rail 425. Here, four switch cells 410 are used as an example. A second switch cell organization 404 includes a different number of switch cells 410 configured to switch power from the power rail 420 to a local power rail 435. Here, the switch cells 410 of both switch cell organizations are the same switch cells 410.

The switch cell organization 404 includes one half the number of switch cells 410 in the switch cell organization 402, or two switch cells 410. Based on the utilization calculated for a particular region, a selection between the switch cell organizations 402 and 404 may be made. Regions with lower utilization may use the switch cell organization 404 while regions with a higher utilization may use the switch cell organization 402. As a result, an amount of leakage may be reduced as less switch cells 410 are used for some regions.

Referring to FIG. 5, a switch cell organization 502 may include multiple larger switch cells 510 configured to switch power from a power rail 520 to a local power rail 525. A second switch cell organization 504 may include smaller switch cells 515 configured to switch power from the power rail 520 to a local power rail 535. Here, switch cells 515 are smaller than switch cells 510. Accordingly, if the switch cells 510 are replaced with the switch cells 515, an amount of leakage may be reduced because of the usage of smaller switch cells 515.

Referring to FIG. 6, a switch cell organization 602 includes lower threshold (LT) switch cells 610 configured to switch power from a power rail 620 to a local power rail 625. A switch cell organization 604 includes higher threshold (HT) switch cells 616 configured to switch power from a power rail 620 to a local power rail 635.

Here, LT switch cells 610 have smaller thresholds than HT switch cells 615. Accordingly, if the LT switch cells 610 are replaced with the HT switch cells 615, an amount of leakage may be reduced because of the usage of HT switch cells 515.

Although two different switch cell organizations have been described, any number of different switch cell organizations may be used. For example, one or more switch cells 410 may be removed for the switch cell organization 402 to generate different switch cell organizations. In another example, any number of larger switch cells 510 may be replaced with smaller switch cells 515. Similarly, any number of lower threshold switch cells 610 may be replaced with higher threshold switch cells 616. Moreover, different switch cell organizations may be combined. For example, a switch cell 410 may be removed from switch cell organization 402 while another switch cell 410 is replaced with a smaller switch cell 515. Furthermore, although some examples of different switch cell organizations have been described, any switch cell organization using switch cells, whether different in number, type, or any other attribute, that reduces the leakage may be used as a switch cell organization.

Figure 7:
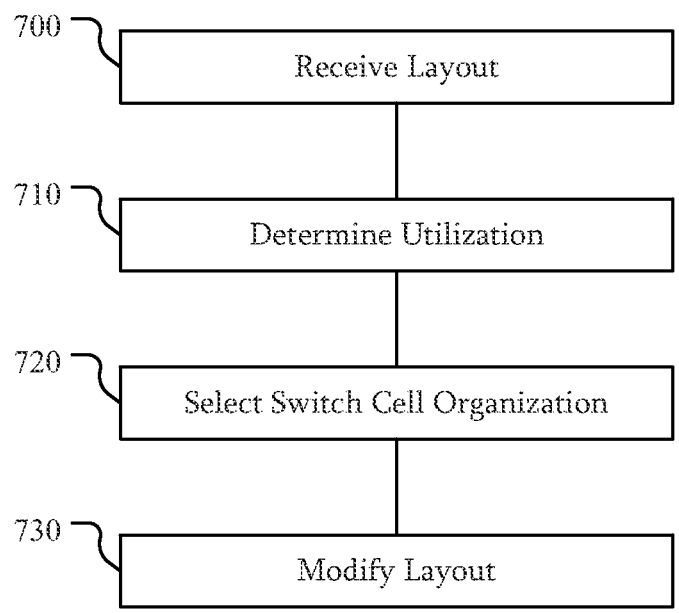
FIG. 7 is a flowchart illustrating a method of preparing a layout according to an embodiment.

FIG. 7 is a flowchart illustrating a method of preparing a layout according to an embodiment. In this embodiment, in 700 a layout of an integrated circuit is received. The layout may be received and stored in a memory, such as random access memory (RAM), a mass storage device, network attached storage, or the like.

In an embodiment, the layout may already be divided into regions. However, in other embodiments, the layout may not be divided into regions when the layout is initially received. Accordingly, as part of receiving the layout, the layout may be divided into the multiple regions. For example, a layout similar to the layout 200 of FIG. 2 may be received. The layout 200 may not be divided into regions. The layout may be analyzed to determine which logic cells in regions 210, 220, 230 and 240 are associated with which switch cells in regions 215, 225, 235, and 245 configured to control power delivered to the logic cells in the region. In particular, once the association is determined, regions, such as the regions 360, 362, and 364 of the layout 300 of FIG. 3, may be determined.

Although one example of dividing the layout into regions has been described, other techniques may be used. For example, switch cells may not be placed in the layout, yet space may be reserved for the switch cells. For example, a power rail pitch may be about 40 μm. The power rail pitch may provide one dimension common to the regions. That is, the regions may be divided by the power rails along one direction.

The division of the regions along a second direction may be made using different criteria. For example, the regions may be divided along functional boundaries of the logic cells. In another example, the regions may divided according to a length of switch cells in a switch cell organization. In a particular example, if two switch cell organizations include four switch cells in one organization and three switch cells in a second organization, the second dimension of the regions may be associated with a length of the four switch cells. The logic cells between the power rails and within the length of the four switch cells may form a region. Any association of switch cells and logic cells may be used to create a region of the layout.

As a result, the layout includes multiple regions as described above. In 710, a utilization is determined for each region of the layout as described above. Although a utilization for every region of the entire layout may be determined, in other embodiments, the multiple regions of the layout may not cover the entire layout. That is, the regions may only cover certain portions of the layout, such as logic cells that may have power switched by switch cells. Other portions, such as portions that do not have power that may be switched, may, but need not be included in the regions of the layout.

In 720, for each region, a switch cell organization for the region is selected from among multiple switch cell organizations in response to the corresponding utilization. As described above, a variety of different switch cells, number of switch cells, or the like may form multiple switch cell organizations. In a particular embodiment, a threshold may be selected. For utilizations above the threshold, a first switch cell organization with larger devices, more devices, or the like may be selected. For utilizations below the threshold a different switch cell organization with smaller devices, less devices, or the like may be selected. In other embodiments with N switch cell organizations, N−1 thresholds may be used to select among the switch cell organizations.

In 730, for each region, the layout is modified to include switch cells for the region according to the selected switch cell organization. As described above, modifying the layout may include placing switch cells according to the switch cell organization. In other embodiments, modifying the layout may include removing existing switch cells, replacing existing switch cells, or the like. Regardless, the switch cells in the layout for the region are modified such that the result is according to the selected switch cell organization.

The modification of the layout in 730 may be performed at a variety of stages in preparing a layout. For example, the layout may be modified before clock tree placement. In another example, the layout may be modified before routing.

Figure 8:
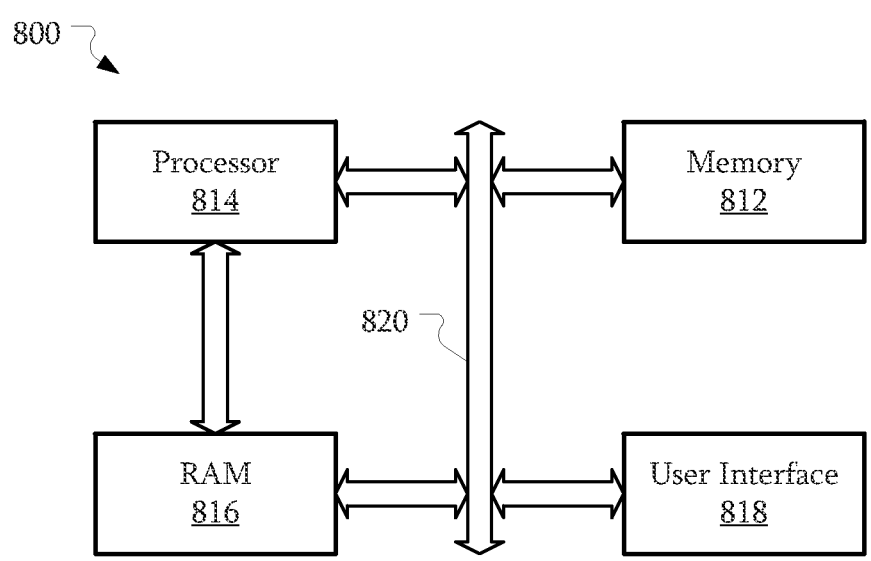
FIG. 8 is a schematic view of an electronic system according to an embodiment.

FIG. 8 is a schematic view of an electronic system according to an embodiment. The electronic system 800 may be part of a wide variety of electronic devices including, but not limited to, servers, workstations, portable notebook computers, Ultra-Mobile PCs (UMPC), Tablet PCs, mobile telecommunication devices, and so on. Any system that may possess a layout of an integrated circuit may include the electronic system 800. For example, the electronic system 800 may include a memory system 812, a processor 814, RAM 816, and a user interface 818, which may execute data communication using a bus 820.

The processor 814 may be a microprocessor or a mobile processor (AP). The processor 814 may have a processor core (not illustrated) that can include a floating point unit (FPU), an arithmetic logic unit (ALU), a graphics processing unit (GPU), and a digital signal processing core (DSP Core), or any combinations thereof. The processor 814 may execute the program and control the electronic system 800. The processor 814 may be configured to perform some or all of the operations described above.

The RAM 816 may be used as an operation memory of the processor 814. Alternatively, the processor 814 and the RAM 816 may be packaged in a single package body. The RAM 816 may be configured to store a layout during processing as described above.

The user interface 818 may be used in inputting/outputting data to/from the electronic system 800. For example, the user interface 818 may include a display configured to present a layout to a user. The user interface 818 may also include a pointing device, a keyboard, or other input devices configured to allow a user to interact with the layout. Moreover, the user interface 818 may include a network interface configured to receive a layout as described above.

The memory system 812 may store codes for operating the processor 814, data processed by the processor 814, or externally input data. The memory system 812 may include a controller and a memory. The memory system 812 may include an interface to computer readable media. Such computer readable media may store instructions to perform the variety of operations describe above.

Although the structures, methods, and systems have been described in accordance with exemplary embodiments, one of ordinary skill in the art will readily recognize that many variations to the disclosed embodiments are possible, and any variations should therefore be considered to be within the spirit and scope of the apparatus, method, and system disclosed herein. Accordingly, many modifications may be made by one of ordinary skill in the art without departing from the spirit and scope of the appended claims.

The invention claimed is:

1. A method, comprising:
receiving, by a computer, a layout of an integrated circuit having a plurality of regions;
determining, by a computer, a utilization for each of the regions, including, for each region, determining the utilization for the region in response to scaling at least one of a cell density and a clock speed of the region;
for each region, selecting, by a computer, from among a plurality of switch cell organizations for the region in response to the corresponding utilization; and
for each region, modifying, by a computer, the layout to include switch cells for the region according to the selected switch cell organization.

2. The method of claim 1, wherein:
the switch cell organizations include a first switch cell organization and a second switch cell organization; and
the first switch cell organization includes switch cells smaller than switch cells of the second switch cell organization.

3. The method of claim 1, wherein:
the switch cell organizations include a first switch cell organization and a second switch cell organization; and
the first switch cell organization includes a number of switch cells different than the second switch cell organization.

4. The method of claim 1, wherein:
the switch cell organizations include a first switch cell organization and a second switch cell organization; and
the first switch cell organization includes switch cells having thresholds different than switch cells of the second switch cell organization.

5. The method of claim 1, wherein, for each region, determining the utilization comprises multiplying the cell density of cells in the region by the clock speed of cells in the region to generate the utilization.

6. The method of claim 5, wherein, for each region, determining the utilization comprises scaling contributions of different cells in the region differently when calculating the utilization.

7. The method of claim 6, wherein, for each region, determining the utilization comprises scaling contributions of clock cells in the region greater than contributions of other cells when calculating the utilization.

8. The method of claim 1, wherein modifying the layout is performed before routing.

9. The method of claim 1, wherein modifying the layout is performed before clock tree placement.

10. The method of claim 1, wherein:
receiving the layout of the integrated circuit having the plurality of regions comprises receiving the layout and dividing the layout into the plurality of regions, each region associated with switch cells configured to control power delivered to the region;
and wherein determining the utilization for each of the regions comprises, for each region, multiplying a number of cells in the region by the clock speed for the region to generate the utilization; and
wherein modifying the layout to include switch cells for the region according to the selected switch cell organization comprises, for each region, modifying, replacing, or removing the switch cells of the region.

11. A system, comprising:
a memory configured to store a layout of an integrated circuit having a plurality of regions;
a processor coupled to the memory and configured to, for each of the regions:
determine a utilization in response to scaling at least one of a cell density and a clock speed of the region;
select from among a plurality of switch cell organizations for the region in response to the corresponding utilization; and
modifying the layout to include switch cells for the region according to the selected switch cell organization.

12. The system of claim 11, wherein:
the switch cell organizations include a first switch cell organization and a second switch cell organization; and
the first switch cell organization includes switch cells smaller than switch cells of the second switch cell organization.

13. The system of claim 11, wherein:
the switch cell organizations include a first switch cell organization and a second switch cell organization; and
the first switch cell organization includes a number of switch cells different than the second switch cell organization.

14. The system of claim 11, wherein:
the switch cell organizations include a first switch cell organization and a second switch cell organization; and
the first switch cell organization includes switch cells having thresholds different than switch cells of the second switch cell organization.

15. The system of claim 11, wherein the processor is further configured to, for each region, multiply the cell density of cells in the region by the clock speed of cells in the region to generate the utilization.

16. The system of claim 15, wherein the processor is further configured to, for each region, weight different cells in the region differently when calculating the utilization.

17. The system of claim 16, wherein the processor is further configured to, for each region, weight clock cells in the region greater than other cells when calculating the utilization.

18. The system of claim 11, wherein the processor is further configured to modify the layout before routing.

19. The system of claim 11, wherein the processor is further configured to modify the layout before clock tree placement.

20. A non-transitory computer readable medium storing instructions, comprising:
instructions for receiving a layout of an integrated circuit having a plurality of regions;
instructions for determining a utilization for each of the regions including, for each region, determining the utilization for the region in response to scaling at least one of a cell density and a clock speed of the region;
instructions for, for each region, selecting from among a plurality of switch cell organizations for the region in response to the corresponding utilization; and
instructions for, for each region, modifying the layout to include switch cells for the region according to the selected switch cell organization.

* * * * *